(12) United States Patent
Wexler et al.

(10) Patent No.: US 11,008,520 B2
(45) Date of Patent: May 18, 2021

(54) PROCESS FOR RECONFIGURING EXISTING TREATING UNITS IN A REFINERY

(71) Applicant: UOP LLC, Des Plaines, IL (US)

(72) Inventors: James Wexler, East Lansing, MI (US); Jose R. Rojas, Richmond, TX (US); Donald A. Eizenga, Elk Grove Village, IL (US)

(73) Assignee: UOP LLC, Des Plaines, IL (US)

( * ) Notice: Subject to any disclaimer, the term of this patent is extended or adjusted under 35 U.S.C. 154(b) by 92 days.

(21) Appl. No.: 15/878,100

(22) Filed: Jan. 23, 2018

(65) Prior Publication Data

US 2018/0148654 A1     May 31, 2018

Related U.S. Application Data

(63) Continuation of application No. PCT/US2016/044974, filed on Aug. 1, 2016.

(60) Provisional application No. 62/201,904, filed on Aug. 6, 2015.

(51) Int. Cl.
    *C10G 3/00*      (2006.01)
    *B01J 19/24*      (2006.01)
    *C10G 45/58*      (2006.01)

(52) U.S. Cl.
    CPC ............... *C10G 3/50* (2013.01); *B01J 19/245* (2013.01); *C10G 45/58* (2013.01); *B01J 2219/00024* (2013.01); *C10G 2300/4056* (2013.01); *Y02P 30/20* (2015.11)

(58) Field of Classification Search
CPC .......... C10G 65/043; C10G 2300/4056; C10G 3/50; B01J 19/245
See application file for complete search history.

(56) References Cited

U.S. PATENT DOCUMENTS

| 4,310,440 A | 1/1982 | Wilson et al. |
| 4,440,871 A | 4/1984 | Lok et al. |
| 4,758,419 A | 7/1988 | Lok et al. |
| 4,793,984 A | 12/1988 | Lok et al. |

(Continued)

FOREIGN PATENT DOCUMENTS

| WO | 2009025542 A1 | 2/2009 |
| WO | 2012087505 A2 | 6/2012 |

(Continued)

OTHER PUBLICATIONS

Yeung, "Prospects of processing biofeeds in petroleum refineries", Zhongwai Nengyuan (2009), 14(7), 59-66. Language: Chinese.

(Continued)

*Primary Examiner* — Jacob J Cigna
*Assistant Examiner* — Michael W Hotchkiss
(74) *Attorney, Agent, or Firm* — Paschall & Associates, LLC; James C. Paschall

(57) ABSTRACT

Processes for converting existing refinery units and equipment to enable processing of renewable triglyceride feedstock to provide hydrocarbon fuels. Originally, the existing refinery units may have bene configured as hydrotreating, hydrocracking, fixed bed reforming, or isomerization units for a petroleum based feedstock. Hydrogen from a second reaction zone may be provide to the first reaction zone, without or without the use of a compressor.

18 Claims, 4 Drawing Sheets

(56) References Cited

U.S. PATENT DOCUMENTS

| | | | |
|---|---|---|---|
| 4,795,623 | A | 1/1989 | Evans |
| 4,924,027 | A | 5/1990 | Kulprathipanja et al. |
| 4,943,424 | A | 7/1990 | Miller |
| 5,082,956 | A | 1/1992 | Monnier et al. |
| 5,087,347 | A | 2/1992 | Miller |
| 5,158,665 | A | 10/1992 | Miller |
| 5,208,005 | A | 5/1993 | Miller |
| 5,246,566 | A | 9/1993 | Miller |
| 5,510,306 | A | 4/1996 | Murray |
| 5,716,897 | A | 2/1998 | Galperin et al. |
| 5,741,759 | A | 4/1998 | Gee et al. |
| 5,851,949 | A | 12/1998 | Galperin et al. |
| 7,906,013 | B2 * | 3/2011 | Kokayeff ............... C10G 65/04 208/208 R |
| 8,288,600 | B2 * | 10/2012 | Bartek ..................... C10G 1/06 585/240 |
| 8,324,438 | B2 | 12/2012 | Brandvold et al. |
| 8,344,194 | B2 * | 1/2013 | Bartek ..................... C10G 1/06 585/240 |
| 8,518,241 | B2 * | 8/2013 | Petri ....................... C10G 65/10 208/58 |
| 8,686,203 | B2 * | 4/2014 | Hanks ..................... C10G 65/02 585/240 |
| 8,742,183 | B2 | 6/2014 | McCall et al. |
| 8,888,871 | B2 | 11/2014 | Corredores et al. |
| 8,999,141 | B2 * | 4/2015 | Kokayeff ............... C10G 65/02 208/58 |
| 9,109,177 | B2 * | 8/2015 | Freel ........................ B01J 4/008 |
| 9,279,087 | B2 * | 3/2016 | Kokayeff ............... C10G 65/00 |
| 9,534,178 | B2 * | 1/2017 | Ma .......................... B01J 8/0492 |
| 9,845,432 | B2 * | 12/2017 | Rispoli ..................... C10G 3/50 |
| 10,633,606 | B2 * | 4/2020 | Freel ....................... C10G 11/18 |
| 2004/0045780 | A1 * | 3/2004 | Bernbaum ............... A45C 3/00 190/109 |
| 2004/0045870 | A1 * | 3/2004 | Wrisberg ............... C10G 65/10 208/59 |
| 2004/0230085 | A1 | 11/2004 | Jakkula et al. |
| 2006/0264684 | A1 * | 11/2006 | Petri ....................... C10G 45/02 585/250 |
| 2009/0193709 | A1 * | 8/2009 | Marker ..................... C01B 3/16 44/308 |
| 2010/0206773 | A1 * | 8/2010 | Case ....................... C10G 47/00 208/107 |
| 2012/0022307 | A1 | 1/2012 | Yanik et al. |
| 2012/0116134 | A1 * | 5/2012 | Bozzano ................ C10G 45/02 585/240 |
| 2012/0156109 | A1 | 6/2012 | Parimi et al. |
| 2012/0157727 | A1 * | 6/2012 | Parimi ................... B01J 8/0457 585/240 |
| 2013/0145683 | A1 | 6/2013 | Freel et al. |
| 2013/0289324 | A1 * | 10/2013 | Price ..................... B01J 29/084 585/469 |
| 2014/0109465 | A1 | 4/2014 | Coppola et al. |
| 2015/0073188 | A1 | 3/2015 | Floudas et al. |

FOREIGN PATENT DOCUMENTS

| | | |
|---|---|---|
| WO | 2014033762 A1 | 3/2014 |
| WO | 2015075315 A1 | 5/2015 |

OTHER PUBLICATIONS

Egeberg, "Industrial-scale production of renewable diesel", Petroleum Technology Quarterly (2011) v 16, n 3, pp. 1-7.

Egeberg, "Hydrotreating in the production of green diesel", Petroleum Technology Quarterly (2010), v 15, n 3, pp. 101-113.

Melero, "Biomass as renewable feedstock in standard refinery units. Feasibility, opportunities and challenges", Energy and Environmental Science (2012), v 5, n 6, pp. 7393-7420.

Miller, "New molecular sieve process for lube dewaxing by wax isomerization", Microporous Materials, vol. 2, Jun. 1994, pp. 439-449.

Search Report dated Nov. 17, 2016 for corresponding PCT Appl. No. PCT/US2016/044974.

* cited by examiner

PROCESS FOR RECONFIGURING EXISTING TREATING UNITS IN A REFINERY

CROSS-REFERENCE TO RELATED APPLICATIONS

This application is a Continuation of International Application No. PCT/US2016/044974 filed Aug. 1, 2016 which application claims benefit of U.S. Provisional Application No. 62/201,904 filed Aug. 6, 2015, the contents of which cited applications are hereby incorporated by reference in their entirety.

FIELD OF THE INVENTION

This invention relates generally to processes for producing hydrocarbon product streams from a renewable resource, and more particularly to processes for reconfiguring existing processing units originally designed to process petroleum based feedstocks in order to effectively and efficiently process renewable feedstocks.

BACKGROUND OF THE INVENTION

In addition to producing fuels from petroleum feedstocks, fuels, such as gasoline, diesel, aviation fuel, can also be manufactured using carbon and hydrogen derived from organic biomass, such as vegetable oils, organic fats, and organic greases. The processing of these "renewable feedstocks" is becoming more and more popular around the world especially based upon concerns from limited petroleum resources, increasing energy demand, greenhouse gas emissions and related climate change concerns.

For example, biological oils and fats can be converted into diesel, naphtha and jet fuels using many different processes, such as hydro-deoxygenation and hydro-isomerization processes.

The economic environment for renewable fuel technology (triglyceride oil conversion to green diesel and green jet fuels) presents challenging hurdles. Often the fuel production and use are driven by policy mandates (e.g. in Europe and other countries) or other incentives such as the Renewable Volume Obligations and Renewable Identification Numbers (RINS) system developed by the US EPA. These may be to address global warming or to enhance energy stability and security via domestic production. In addition, many project developers have limited access to capital and therefore must be entrepreneurial. Finally, with the expansion of large complex export refineries throughout the Middle East and Asia and improved fuel economy in the US, there is pressure on refiners who have underperforming assets. In such an economic environment, there is often need to minimize capital costs in order to have favorable renewable project economics.

The reconfiguration of existing equipment assets in a refinery unit(s) can address this problem. However, due to the processing requirements and aspects of the renewable feedstocks, the redesign of the processing units does involve technical problems that must be addressed in order to successfully use the existing petroleum refinery units for processing renewable feedstocks.

The present invention provides various processes for overcoming these technical hurdles and use of existing assets to allow for same to process renewable feedstocks.

SUMMARY OF THE INVENTION

One or more processes have been invented which allow for existing refinery units to be reconfigured to provide for the processing of a renewable feedstock. As mentioned above, reconfiguring existing processing equipment and units does present technical challenges, which include: the requirement for two-stage processing (first stage deoxygenation followed by second stage isomerization); the high acidity of the first stage feedstock and reaction intermediates (free fatty acids in the feed); the high levels of contaminants (phosphorous, alkali metals, iron, chlorides, organic nitrogen) in first stage feeds; the high reactivity of the first stage feed; the thermal instability of the first stage feed; and, the carbon dioxide acid gas generation associated with the first stage processing. The various processes, embodiments, and aspects of the present invention all seek to address one or more of these technical challenges.

Therefore, in a first embodiment of the invention, the present invention may be characterized broadly as providing a process for converting petroleum processing units into a renewable fuel processing plant by: reconfiguring a first reaction zone configured to treat a petroleum feedstock to a reaction zone for treating a renewable feedstock into hydrocarbons and providing a treated effluent; providing a stripping zone configured to remove one or more of hydrogen sulfide ($H_2S$), ammonia ($NH_3$), water ($H_2O$), carbon monoxide (CO) and carbon dioxide ($CO_2$), from the treated effluent; providing a scrubbing zone configured to remove carbon dioxide from the gaseous stream and provide a scrubbed gaseous stream; reconfiguring a second reaction zone configured to treat a petroleum feedstock to a reaction zone for converting the treated effluent from first reaction zone and providing a converted effluent; separating a hydrogen containing gas from the converted effluent; and, passing the hydrogen containing gas separated from the converted effluent to the first reaction zone.

In at least one embodiment, the pressure of the first reaction zone is between about 3,447 and about 17,240 kPag and the pressure of the second reaction zone is between about 2,758 to about 4,826 kPag.

In at least one embodiment, the pressure of the first reaction zone is between about 3,447 and about 5,516 kPag and the pressure of the second reaction zone is between about 4,137 and about 17,240 kPag.

In at least one embodiment, the pressure of the first reaction zone is between about 3,447 and about 17,240 kPag and the pressure of the second reaction zone is between about 2,758—and about 17,240 kPag.

In at least one embodiment, at least one of the reaction zones was configured to treat the petroleum feedstock as a hydrotreating zone, a hydrocracking zone, a reforming zone, or an isomerization zone.

In at least one embodiment, both of the reaction zones were configured to treat the petroleum feedstock as a hydrotreating zone, a hydrocracking zone, a reforming zone, or an isomerization zone.

In at least one embodiment, the first reaction zone treated the petroleum feedstock differently than the second reaction zone.

In at least one embodiment, the process includes providing a guard bed zone for the reconfigured first reaction zone to remove metals, phosphorus, or both from the renewable feedstock.

In at least one embodiment, converting the first reaction zone includes providing the first reaction zone with a metallurgy that has a lower rate of corrosion to acids compared to an original metallurgy.

In at least one embodiment, the process includes providing a line for combining a portion of the treated effluent with the renewable feedstock.

In a second aspect of the present invention, the present invention may be generally characterized as providing a process for converting petroleum processing units into a renewable fuel processing plant by: providing a first reaction zone having an original configuration for treating a petroleum feedstock; reconfiguring the first reaction zone to provide a reconfigured first reaction zone for treating a renewable feedstock and providing a treated effluent; providing a guard bed zone for the reconfigured first reaction zone, the guard bed zone configured to remove metals, phosphorus, or both from the renewable feedstock; providing a second reaction zone having an original configuration for treating a petroleum feedstock; and, reconfiguring the second reaction zone to provide a reconfigured second reaction zone for converting the treated effluent and to provide a converted effluent, wherein the original configuration of at least one of the first reaction zone and the second reaction zone was as a hydrocracking zone, a reforming zone, or an isomerization zone.

In at least one embodiment, the original configuration of the other of the first reaction zone and the second reaction zone was as a hydrotreating zone, a hydrocracking zone, a reforming zone, or an isomerization zone.

In at least one embodiment, after reconfiguring the pressure of the first reaction zone is between about 3,447 and about 17,240 kPag and the pressure of the second reaction zone is between about 2,758 to about 4,826 kPag.

In at least one embodiment, after reconfiguring the pressure of the first reaction zone is between about 3,447 and about 5,516 kPag and the pressure of the second reaction zone is between about 4,137 and about 17,240 kPag.

In at least one embodiment, after reconfiguring the pressure of the first reaction zone is between about 3,447 and about 17,240 kPag and the pressure of the second reaction zone is between about 2,758 and about 17,240 kPag.

In at least one embodiment, the process includes providing a first separation zone for separating the treated effluent from the first reaction zone; and, providing a second separation zone for separating the converted effluent from the second reaction zone. It is contemplated that one separation zone includes a compressor for a recycle gas stream. It is further contemplated that the second separation zone provides a hydrogen containing gas stream that is passed to the first reaction zone. It is also contemplated that both the first reaction zone and the second reaction zone receive a recycle gas stream that is combined with a make-up hydrogen gas stream.

In a third aspect of the present invention, the present invention may be characterized generally as providing a process for converting a petroleum processing unit into a renewable fuel processing unit by: providing a first reaction zone having an original configuration for treating a petroleum feedstock, wherein the original configuration of the first reaction zone was as a hydrotreating zone, a hydrocracking zone, a reforming zone, or an isomerization zone; reconfiguring the first reaction zone to provide a reconfigured first reaction zone for treating a feedstock comprising substantially all renewable feedstock and providing a treated effluent; providing a guard bed zone for the reconfigured first reaction zone, the guard bed zone configured to remove metals, phosphorus, or both from the renewable feedstock; providing a stripping zone configured to remove one or more of hydrogen sulfide ($H_2S$), ammonia ($NH_3$), water ($H_2O$), carbon monoxide (CO) and carbon dioxide ($CO_2$) from a portion of the treated effluent and provide a liquid treated effluent and a gaseous stream including the carbon dioxide; providing a scrubbing zone configured to remove carbon dioxide from the gaseous stream and provide a scrubbed gaseous stream; and, providing a line to pass the liquid treated effluent to a fuel blending pool.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

Figure 1:
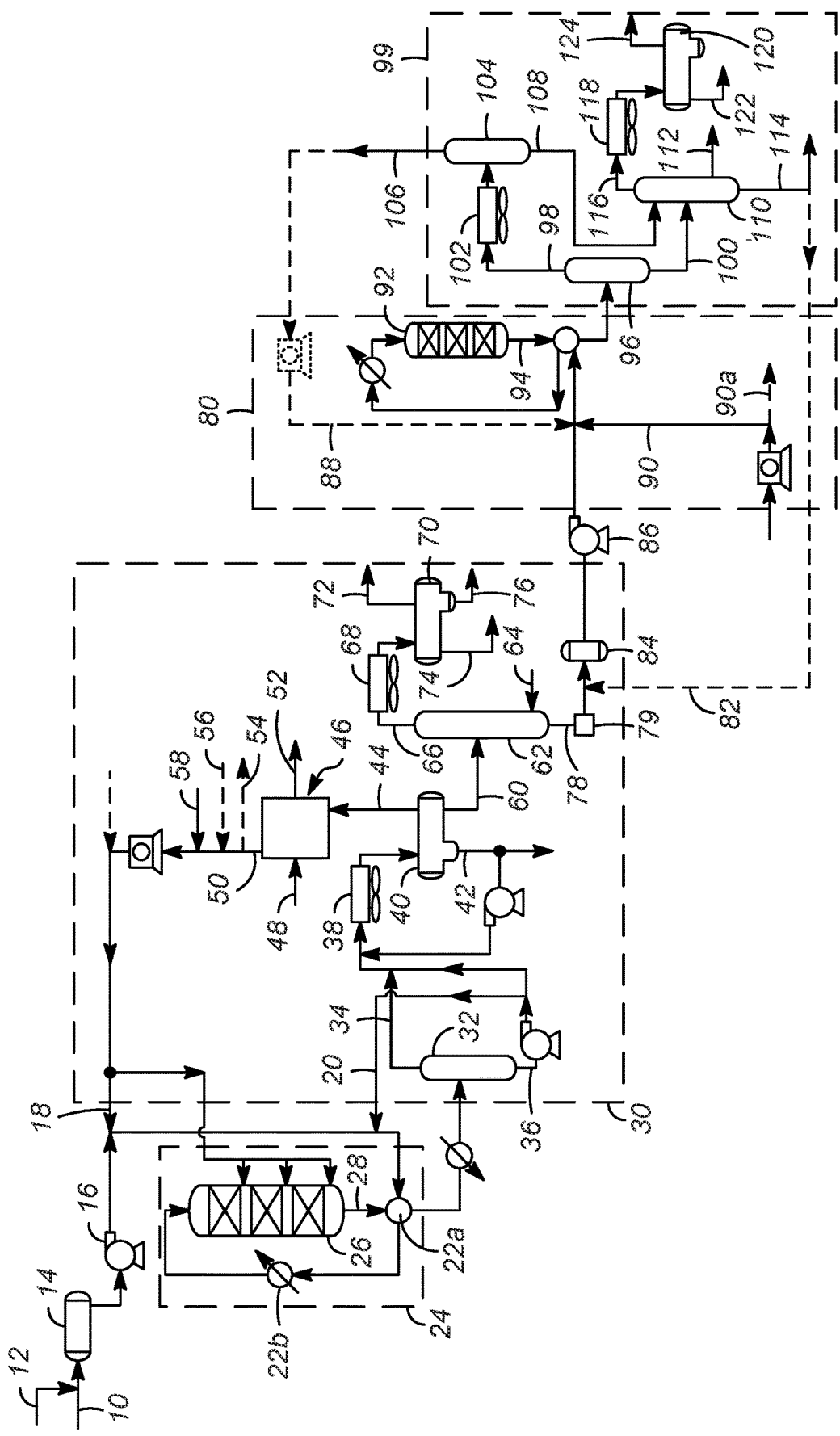
FIG. 1 shows a detailed flow scheme for one or more embodiments of the present invention.

As mentioned above, the present invention provides various processes for converting existing refinery units and equipment to enable processing of renewable triglyceride feedstock to provide hydrocarbon fuels. As mentioned above, reconfiguring existing refinery units/equipment requires modifications to overcome typical existing equipment limitations.

While several exemplary flow schemes will be described below, in general, suitable typical refinery units that would be useful for conversion into a two stage renewable process include: hydrotreating (hydrodesulfurization), hydrocracking (mild hydrocracking or full conversion, single or multiple stages), fixed bed reforming (particularly older units designed for relatively high pressure), or isomerization units. The reconfiguration may utilize two units and/or individual pieces of equipment added to one or more refinery units. The use of two or more distillate hydrotreating units is a more preferred option when available due to the typical existing metallurgy and design pressures. The first unit would be converted to deoxygenation service with suitable graded bed, guard, and deoxygenation catalysts. The second unit would be converted to isomerization service with suitable catalyst. Unlike other processes in which only two hydrotreating units are reconfigured, the present invention allows for the utilization of other types of processing units, such as isomerization, hydrocracking, and reforming units. Furthermore, unlike some prior art processes, the present invention contemplates processing a feed stock that is substantially all renewable feedstock—as opposed to co-processing renewable feedstock and petroleum feedstocks. By "substantially all" it is meant that the feed stock comprises more than 50 wt %, or more than 60 wt %, preferably more than 75 wt % or most preferably more than 90 wt % of a renewable feed stock.

Triglyceride oil acidity can be handled either by the use of pre-treatment technology (e.g. typical vegetable oil deodorization) to maintain a very low level of free fatty acids (FFA), or by the upgrading of feed system equipment as required. For example tanks may be coated and piping upgraded to stainless steel that is resistant to acid attack. Careful selection of the process unit considering piping, exchanger, and reactor metallurgy is important. Metallurgy such as carbon steel and low chrome may have very high corrosion rates at elevated temperatures. Example metallurgies include 304, 321 and 347 stainless steel which may provide increased resistance, but it is preferred to have higher molybdenum steels such as 316 and 317. Other metallurgies may also be considered (e.g. duplex, high nickel alloys).

As mentioned above, carbon dioxide is produced in the deoxygenation reactions and must be removed from the process. Typically, amine in a recycle gas scrubber is used to remove carbon dioxide (acid gas removal). This allows for minimization of purge rates when a recycle gas compressor is used. Amines, such as DEA or specialty amines/solvents such as Dow Ucarsol AP-814, AP-810 or the like, may be used for carbon dioxide removal.

With these general principles in mind, one or more embodiments of the present invention will be described with the understanding that the following description is not intended to be limiting.

As shown in FIG. 1, an exemplary process for converting a renewable feedstock 10 into a fuel stream will be described. The term "feedstock" is meant to include feedstocks that have not been treated to remove contaminants as well as those feedstocks purified in a pretreatment zone (not shown). In the various processes of the present invention, the renewable feedstock 10 may be mixed with a sulfiding agent 12, and passed to a feed surge drum 14. Via a pump 16, the renewable feed stock may be mixed with a hydrogen containing gas 18, as well as a liquid recycle stream 20.

After heating the renewable feedstock 10 in one or more heat exchangers 22a, and a fired heater 22b, the renewable feedstock 10 may be passed to a first reaction zone 24 or a treating zone comprising at least one reactor 26. As mentioned above, the reactor 26 was originally configured for processing petroleum based feedstocks, and may comprise an isomerization, hydrotreating, hydrocracking, or reforming unit. Due to the high acidity of the renewable feedstocks, the existing reactor may require some upgrading.

Triglyceride oil acidity can be handled either by the use of pre-treatment technology (e.g. typical vegetable oil deodorization) to maintain a very low level of free fatty acids (FFA), or by the upgrading of feed system equipment as required. For example tanks may be coated and piping upgraded to stainless steel that is resistant to acid. Careful selection of the process unit considering piping, exchanger, and reactor metallurgy is important. Exemplary metallurgies include those mentioned above. Additionally, there are different types of acid that may be involved. For example, the renewable feedstock 10 may include various organic acids, while an effluent from the reaction first zone 24 may include hydrochloric acid and carbonic acid.

Returning to FIG. 1, in the reaction first zone 24, the renewable feedstock 10 is contacted with a hydrogenation or hydrotreating catalyst, contained in one or more catalyst beds in the reactor 26, in the presence of hydrogen at hydrogenation conditions to hydrogenate the olefinic or unsaturated portions of the n-paraffinic chains and deoxygenate the oxygenated hydrocarbons ("deoxygenation catalysts"). Additionally, as indicated above, the reaction first zone 24 may, in addition to hydrogenation/hydrotreating catalysts, include a guard bed or graded bed of materials.

The relative thermal instability of the renewable feedstock 10 (compared to petroleum based feedstocks) can be addressed by several modifications, including, utilizing a high rate of recycle gas and the liquid recycle stream 20 to dilute the feed, minimizing the process flow dead zones (e.g., putting feed on the tube side of exchangers rather than the shell side), increasing loading of graded bed materials, or a combination thereof.

Triglycerides contain about 10-11% oxygen which produces a high amount of heat during deoxygenation. To control the temperature rise, the liquid recycle stream 20 may be used along with a quench stream (gas or liquid). If existing quench is available it can be used. If not, the recycle rate can be increased (from 2:1 to 4:1 or higher on fresh feed volume basis). The liquid recycle stream 20 (discussed in more detail below) can be from a hot separator 32 (which is more heat efficient), a cold separator 40, or a stripping column 62.

As mentioned above, the reactor 26 may include a guard bed or graded bed of catalyst. The graded bed should include highly porous, high surface area materials. Activity grading can be used starting with inert materials followed by catalyst with increasing activity for metals removal. The graded/guard beds may be in individual reactors or in the same reactor 26 as the primary deoxygenation catalyst. While phosphorous and metals are expected to be absorbed by the graded bed and guard bed materials, feed chlorides may be converted to HCl. In addition, organic nitrogen is converted to ammonia ($NH_3$). Therefore, any effluent cooled below the water dew point will have high acidity levels, which can be addressed via water circulation for quenching and dilution, as well as metallurgy upgrades (e.g. high nickel alloys) as mentioned above.

Hydrogenation conditions include a temperature of 100 to 500° C. (212 to 932° F.) and a pressure of 689 kPa absolute (100 psia) to 13,790 kPa absolute (2,000 psia). In another embodiment the hydrogenation conditions include a temperature of 200 to 300° C. (392 to 572° F.) and a pressure of 1379 kPa absolute (200 psia) to 4,826 kPa absolute (700 psia). Other operating conditions for the hydrogenation zone are well known in the art.

Deoxygenation catalysts are any of those well known in the art such as nickel, nickel/molybdenum, cobalt/molybdenum dispersed on a high surface area support. Other deoxygenation catalysts include one or more noble metal catalytic elements dispersed on a high surface area support. Non-limiting examples of noble metals include Pt and/or Pd dispersed on gamma-alumina. These deoxygenation catalysts are capable of catalyzing decarboxylation and/or deoxygenation of the feedstock to remove oxygen from the glycerides. Triglycerides, being low on sulfur, may cause leaching of sulfur from sulfided catalyst and the high oxygen content may damage the sulfide structure of the catalyst. In order to maintain the catalyst in a partially sulfided state, the sulfiding agent 12 may be added to the renewable feedstock 10, as discussed above, or alternatively, the sulfiding agent 12 may be introduced into the reactor 26 separately from the renewable feedstock 10.

In addition to hydrogenating the molecules of the feedstock, the catalyst will promote the removal of the oxygen atom from the triglycerides/fatty acids through various reactions such as hydrodeoxygenation, decarboxylation and decarbonylation, collectively "deoxygenation." Generally, deoxygenation conditions include a relatively low pressure of 3,447 kPa (500 psia) to 6,895 kPa (1,000 psia), a temperature of 200 to 400° C. (392 to 752° F.) and a liquid hourly space velocity of 0.5 to 10 $hr^{-1}$. In another embodiment the deoxygenation conditions include the same relatively low pressure of 3,447 kPa (500 psia) to 6895 kPa (1,000 psia), a temperature of 288 to 345° C. (550 to 653° F.) and a liquid hourly space velocity of 1 to 4 hr$^{-1}$.

Returning to FIG. 1, a treated effluent 28 from the first reaction zone 24 may be used to heat the renewable feedstock 10 in one of the heat exchangers 22a and passed to a stripping zone 30. In the depicted embodiment, in the stripping zone 30 the treated effluent 28 is passed first to a hot separator vessel 32. A gaseous stream 34 from the hot separator vessel 32 and a liquid stream 36 from the hot separation vessel 32 may both be passed to an air cooler 38 and then to a cold separator vessel 40. A portion of the liquid stream 36 from the hot separator vessel 32 may be utilized as the liquid recycle stream 20, discussed above.

In the cold separator 40 of the stripping zone 30, the various components will separate into various streams. A sour water stream 42 may withdrawn from the cold separator 40 and recycled, processed further, or both. A gaseous stream 44 from the cold separator vessel 40 may be passed to a scrubbing zone 46 from removing carbon dioxide and hydrogen sulfide. The scrubbing zone 46 may comprise any well-known systems in the art, such as reaction with a hot carbonate solution, pressure swing adsorption, absorption with an amine in processes, etc. For example, a lean amine stream 48 may be passed to the scrubbing zone 46 and contacted with the gaseous stream 44 to provide a scrubbed recycle gas 50 being essentially free of carbon dioxide and hydrogen sulfide. A rich amine acid gas stream 52 may be treated as is known in the art.

If needed a purge vent gas 54 can be vented from the process as a portion of the scrubbed recycle gas 50. Additionally, if available a sour gas 56 can be combined with the scrubbed recycle gas 50 as a sulfiding agent for catalyst. A stream of make-up hydrogen 58 from a source, or from the second stage (discussed below) can be mixed with the scrubbed recycle gas 50 (before or after compression depending on the conditions of same). The scrubbed recycle gas 50 can be compressed and used as the hydrogen containing gas 18 discussed above.

Returning to the cold separator 40, a hydrocarbon liquid phase 60 may be withdrawn and passed to a stripping column 62 which receives a stripping fluid 64, such as steam, to remove any remaining light hydrocarbons, as well as carbon dioxide, carbon monoxide, hydrogen sulfide, ammonia and other gases. An overhead stream 66 from the stripping column 62 can be passed to an air cooler 68 and then to a separation vessel 70 which will provide an LPG rich gas stream 72, and unstabilized naphtha stream 74, as well as a water stream 76. A bottoms stream 78 from the stripping column 62 may be passed to a drying zone 79, having for example a vacuum drier, to remove any water from the bottoms stream 78. Alternatively, if the stripping column 62 comprises a re-boiled column (no steam stripping), the drying zone 79 may not be required. A portion of the bottoms stream 78 form the stripping column 62 (after being dried in the drying zone 79) can be used as the liquid recycle stream 20 (not shown) to be mixed with the feed stream 10, preferably before the feed stream 10 passes to the feed surge drum 14.

The bottoms stream 78 from the stripping column 62 comprises the first stage product which is a diesel range waxy paraffin product that, in some embodiments, may be the produced product to be passed to a diesel blending pool. However, since the first stage product comprises essentially normal paraffins, the first stage product will have poor cold flow properties. Therefore, in order to improve the cold flow properties of the first stage product, the first stage product, as the bottoms stream 78 from the stripping column 62, can be passed to an isomerization zone 80.

As shown in FIG. 1, the bottoms stream (or the first stage product) 78 may be combined with a liquid recycle stream 82 and passed to a feed surge drum 84. Via a pump 86, the bottoms stream 78 may be combined with a recycle hydrogen gas 88, a makeup hydrogen gas 90 (which may also provide a stream 90a to the first stage as the stream of make-up hydrogen 58), or both. After exchanging heat in a heat exchanger, the bottoms stream 78 may be passed to a reactor 92 in the isomerization zone 80 which contains an isomerization catalyst and which is operated under isomerization conditions to at least partially isomerize the normal paraffins to branched paraffins.

In the isomerization zone 80, for the production of renewable diesel production, only minimal branching of the hydrocarbons may be required, enough to overcome cold-flow problems of the normal paraffins. Since attempting for significant branching runs the risk of high degree of undesired cracking, the predominant isomerized product is a mono-branched hydrocarbon. Alternatively, for the production of renewable jet fuel, isomerization and cracking may be required.

An isomerized effluent 94 of the isomerization zone 80 comprises a branched-paraffin-rich stream. By the term "rich" it is meant that the isomerized effluent 94 has a greater concentration of branched paraffins than the hydrocarbons entering the isomerization zone 80, and preferably comprises greater than 50 mass-% branched paraffins. It is envisioned that the isomerized effluent 94 comprises 70, 80, or 90 mass-% branched paraffins.

The isomerization can be accomplished in any manner known in the art or by using any suitable catalyst known in the art. One or more beds of catalyst may be used within the reactor(s) 92 in the isomerization zone 80. It is preferred that the isomerization be operated in a co-current mode of operation. Fixed bed, trickle bed down flow or fixed bed liquid filled up-flow modes are both suitable. See also, for example, US 2004/0230085.

Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials may include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminum-silicophosphate molecular sieve, where the metal Me is magnesium (Mg). Suitable MeAPSO-31 catalysts include MgAPSO-31. MgAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449.

Isomerization conditions may include a temperature between 200 to 400° C. (392 to 752° F.) and a pressure between 1,724 kPa absolute (250 psia) to 4,726 kPa absolute (700 psia). In another embodiment the isomerization conditions include a temperature between 300 to 360° C. (572 to 680° F.) and a pressure between 3,102 kPa absolute (450 psia) to 3,792 kPa absolute (550 psia). Other operating conditions for the isomerization zone 80 are well known in the art. Typically, the isomerization conditions are less severe than the deoxygenation conditions, and thus, more petroleum based processing units may be able to be reconfigured for this portion of the renewable processing plant.

An isomerized effluent 94 may be used to heat the bottoms stream 78 and then passed to a separation zone 99. The separation zone 99 may include a separator vessel 96 configured to separate a vapor stream 98 and a liquid stream 100. As the vapor stream 98 will comprise hydrogen, it may be passed to an air cooler 102 and then to a cold separator 104. In the cold separator 104, the components of the vapor stream 98 after it has been cooled will separate. A hydrogen recycle gas stream 106 may be recovered and in some embodiments, discussed below, the hydrogen recycle gas stream 106 may be passed to the first stage as the stream of make-up hydrogen 58, while in other embodiments, the hydrogen recycle gas stream 106 gas may be combined with the bottoms stream 78 as discussed above.

A liquid stream 108 from the cold separator 104 in the separation zone 99 may be passed, along with the liquid stream 100 from the separator vessel 96, to a fractionation column 110. The fractionation column 110 is configured to separate the components of the two liquid streams 100, 108 and provide various streams including, for example, a jet range stream 112, a diesel range stream 114, and an overhead stream 116. A portion of the diesel range stream 114 may be used as the liquid recycle stream 82 discussed above, as well as for a quench liquid (not shown) between beds of the reactor 92 to further control the heat of reaction and provide quench liquid for emergencies. The recycle stream may be introduced to the inlet of one the reactor 92 and/or to any subsequent beds or reactors. One benefit of the hydrocarbon recycle is to control the temperature rise across the individual beds.

The overhead stream 116 from the fractionation column may be cooled in an air cooler 118 and passed to a receiver 120 which may provide a naphtha range stream 122 and an LPG rich gas stream 124.

Figure 3:
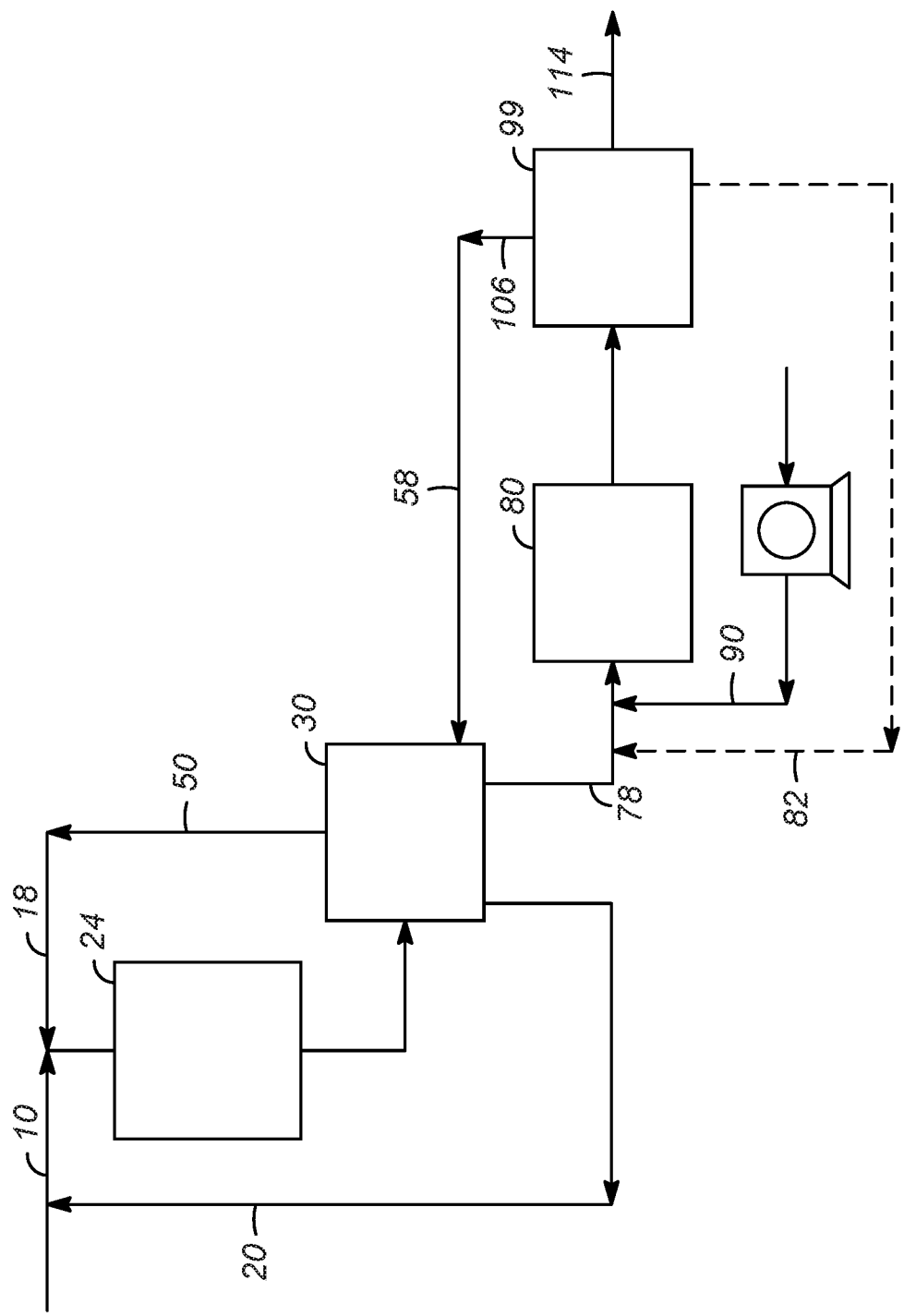
FIG. 3 shows a simplified flow scheme for at least one embodiment of the present invention with lower pressure in the first treating stage and higher pressure in the second conversion stage; and, FIG. 4 shows a simplified flow scheme for at least one embodiment of the present invention with independent pressures and make up gas flow to the first and second stages.
Figure 4:
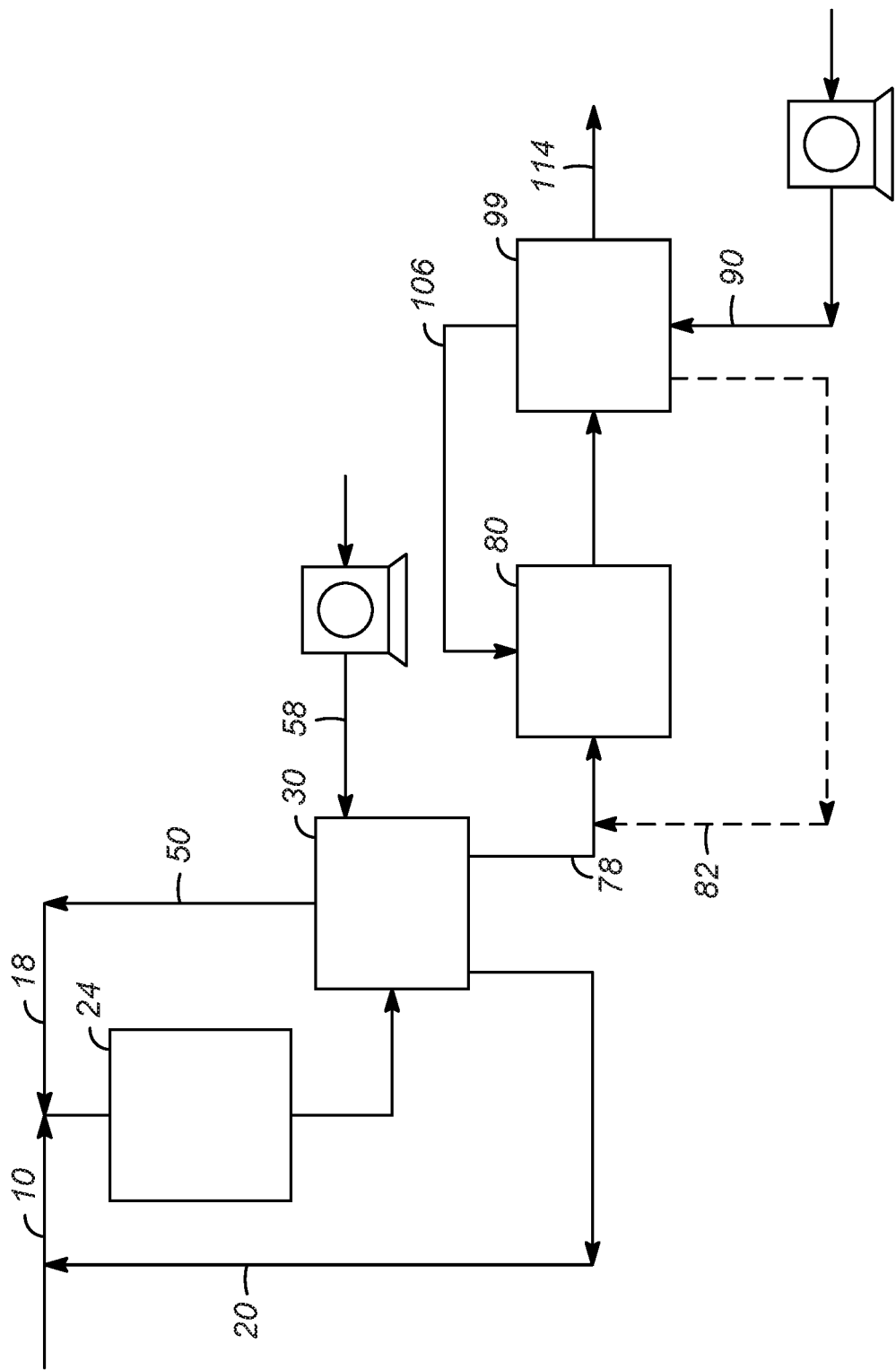

Generally speaking, the processing of the renewable feedstock 10 to provide a renewable fuel product, such as the diesel range stream 114, the jet range stream 112 or even the first stage product (for use as a blending component) requires the a first reaction zone 24, the stripping zone 30, and a compressor for make-up hydrogen. For the diesel range stream 114 or the jet range stream 112, the process typically also requires the second reaction zone, or the isomerization zone 80, as well as the separation zone 99. The following FIGS. 2 to 4 depicted simplified process diagrams utilizing these various zones, based upon zones and units in existing petroleum processing refineries.

Figure 2:
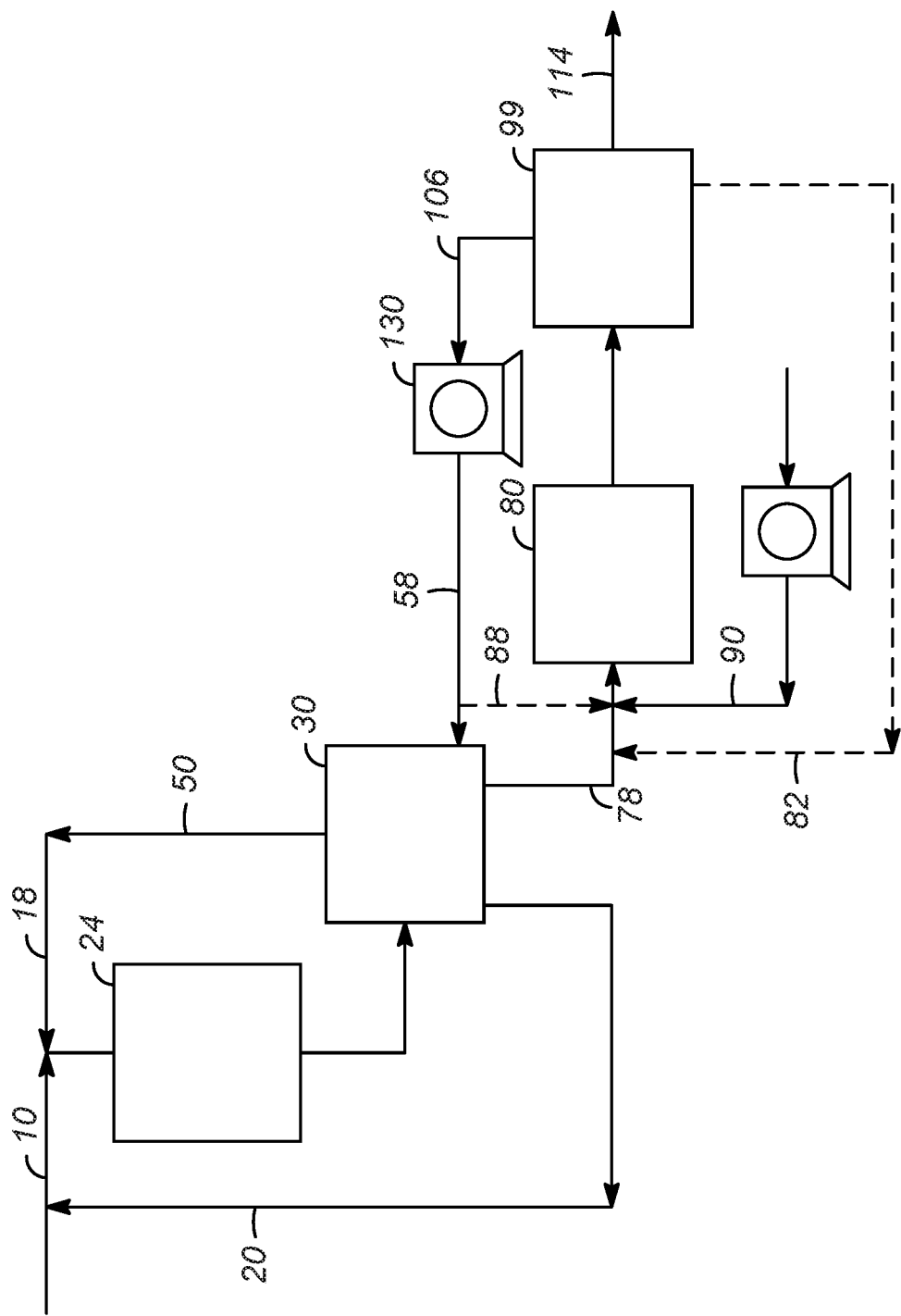
FIG. 2 shows a simplified flow scheme for at least one embodiment of the present invention with higher pressure in the first treating stage and lower pressure in the second conversion stage.

With respect to FIG. 2, the renewable feedstock 10 is combined with the liquid recycle stream 20 and the hydrogen containing gas 18 and passed to the first reaction zone 24 configured to treat the renewable feedstock 10. The first reaction zone 24 comprises a treating zone having a deoxygenation reactor, and may further comprise heaters and heat exchangers. In this embodiment, an operating pressure of the reactor in the treating zone is between about 3,447 and about 17,240 kPag (500 to 2,500 psig). The treated effluent 28 from the first reaction zone 24 is passed to the stripping zone 30 comprising various separator vessels, coolers, strippers, recycle gas scrubbing zones and recycle gas compressors. The liquid recycle stream 20 may be passed from the stripping zone 30 and combined with the renewable feedstock 10. Similarly, the scrubbed recycle gas 50 may be combined with the renewable feedstock 10 as discussed above.

The bottoms stream or the first stage product 78 is combined with a hydrogen gas stream, either the recycle hydrogen gas 88 or the makeup hydrogen gas 90, and possibly the liquid recycle stream 82, and passed to the second reaction zone 80 configured to covert the first stage product by isomerizing the paraffinic hydrocarbons. The second reaction zone 80 or conversion zone includes the isomerization reactor 92 and may further include heaters and heat exchangers. In this embodiment, an operating pressure of the reactor in the converting zone is between about 2,758 to about 4,826 kPag (400 to 700 psig).

The isomerized effluent 94 may be passed to the separation zone 99 which has various separation vessels, coolers, and one or more separation columns. The separation zone 99 will provide at least one liquid stream comprising a hydrocarbon fuels stream such as the diesel range stream 114 or the jet range stream 112. The hydrogen recycle gas stream 106 from the separation zone 99 may be compressed in a compressor 130, and in some embodiments passed only to the first stage, for example by being combined with the scrubbed recycle gas 50 from the stripping zone 30. In this "once through" design, fresh hydrogen is passed to the second reaction zone 80, and the first reaction zone 24 receives make-up hydrogen via the hydrogen recycle gas stream 106 from the separation zone 99. Alternatively, it is contemplated that the hydrogen recycle gas stream 106 is passed back to the second reaction zone 80, for example by being combined with the first stage product 78.

For the embodiments shown in FIG. 2, it is contemplated that the first reaction zone 24 was originally configured as a hydrotreating or hydrocracking zone for petroleum based feedstocks. It is also contemplated that the second reaction zone 80 was originally configured as a less severe reaction zone, such as a hydrotreating, reforming or isomerization zone for treating a petroleum feed. Such a design allows for a higher pressure first stage deoxygenation, which allows for a lower cost, more contaminated feedstock to be processed. For example, some feedstocks are contaminated with high levels of nitrogen (e.g., greater than 100 wt-ppm) which requires more severe processing to convert the nitrogen to ammonia ($NH_3$). Higher pressures and higher hydrogen partial pressure may allow for conversion of organic nitrogen to less than 1 wt-ppm. A lower pressure second stage isomerization also allows for lower temperature and higher catalyst cycle length.

Turning to FIG. 3, in which the operating pressure of the first reaction zone 24 is preferably between about 3,447 to about 5,516 kPag (500 to 800 psig) and the operating pressure of the second reaction zone 80 is between about 4,137 to about 17,240 kPag (600 to 2,500 psig). As shown in FIG. 3, the hydrogen recycle gas stream 106 from the separation zone 99 does not require additional compression and is passed to the first stage without the use the compressor 130 (in FIG. 2). In this embodiment it is contemplated that both reaction zones 24, 80 were originally configured as hydrocracking or hydrotreating zones for petroleum based feedstocks. Such designs may be desirable when the lower pressure unit has higher catalyst volume which is required for maximum throughput for deoxygenation allowing for a reactor with a graded bed, a guard catalyst, and the deoxygenation catalysts.

Turning to FIG. 4, in which, the pressures of the two reaction zones are independent, and may be between about 3,447 to about 17,240 kPag (500 to 2,500 psig) for the first reaction zone 24 and between about 2,758 to 17,240 kPag (400 to 2,500) psig for the second reaction zone 80. As shown, make-up or fresh hydrogen gas 90 is passed into the separation zone 99 (for example by being combined with the hydrogen recycle gas stream 106). Additionally, as shown in FIG. 4, the first reaction zone 24 a fresh hydrogen stream 132 that has been compressed. In this embodiment, both reaction zones 24, 80 may have been originally configured as hydrocracking, hydrotreating, reforming, or isomerization zones for petroleum based feedstocks. Such a design may be desirable when the cascading of hydrogen between reaction zones 24, 80 is not desired or feasible (e.g. long distance between reaction zones 24, 80, reasonable use of existing recycle gas compressors for the two reaction zones 24, 80).

As mentioned above, it is also contemplated that in at least one embodiment, only one existing unit is reconfigured to provide a single stage unit for deoxygenation, such a design would only include the first reaction zone 24, the stripping zone 30, and a compressor, such as compressor 130 from FIG. 2. As mentioned above, in such a design, the first stage product 78 would be a diesel range waxy paraffin product which could be utilized as a high cetane blending component for a diesel pool.

In the various embodiments described herein, the reconfiguration of existing petroleum based processing units can be efficiently achieved to allow for processing of renewable feed products.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a process for converting petroleum processing units into a renewable fuel processing plant, the process comprising reconfiguring a first reaction zone configured to treat a petroleum feedstock to a reaction zone for treating a renewable feedstock into hydrocarbons and providing a treated effluent; providing a stripping zone configured to remove one or more of hydrogen sulfide ($H_2S$), ammonia ($NH_3$), water ($H_2O$), carbon monoxide (CO) and carbon dioxide ($CO_2$) from the treated effluent; providing a scrubbing zone configured to remove carbon dioxide from the gaseous stream and provide a scrubbed gaseous stream; reconfiguring a second reaction zone configured to treat a petroleum feedstock to a reaction zone for converting the treated effluent from first reaction zone and providing a converted effluent; separating a hydrogen containing gas from the converted effluent; and, passing the hydrogen containing gas separated from the converted effluent to the first reaction zone. An embodiment of the invention is one, any or all of prior embodiments in this paragraph up through the first embodiment in this paragraph wherein the pressure of the first reaction zone is between about 3,447 and about 17,240 kPag and the pressure of the second reaction zone is between about 2,758 to about 4,826 kPag. An embodiment of the invention is one, any or all of prior embodiments in this paragraph up through the first embodiment in this paragraph wherein the pressure of the first reaction zone is between about 3,447 and about 5,516 kPag and the pressure of the second reaction zone is between about 4,137 and about 17,240 kPag. An embodiment of the invention is one, any or all of prior embodiments in this paragraph up through the first embodiment in this paragraph wherein the pressure of the first reaction zone is between about 3,447 and about 17,240 kPag and the pressure of the second reaction zone is between about 2,758 and about 17,240 kPag. An embodiment of the invention is one, any or all of prior embodiments in this paragraph up through the first embodiment in this paragraph wherein at least one of the reaction zones was configured to treat the petroleum feedstock as a hydrotreating zone, a hydrocracking zone, a reforming zone, or an isomerization zone. An embodiment of the invention is one, any or all of prior embodiments in this paragraph up through the first embodiment in this paragraph wherein both of the reaction zones were configured to treat the petroleum feedstock as a hydrotreating zone, a hydrocracking zone, a reforming zone, or an isomerization zone. An embodiment of the invention is one, any or all of prior embodiments in this paragraph up through the first embodiment in this paragraph wherein the first reaction zone treated the petroleum feedstock differently than the second reaction zone. An embodiment of the invention is one, any or all of prior embodiments in this paragraph up through the first embodiment in this paragraph further comprising providing a guard bed zone for the reconfigured first reaction zone to remove metals, phosphorus, or both from the renewable feedstock. An embodiment of the invention is one, any or all of prior embodiments in this paragraph up through the first embodiment in this paragraph wherein converting the first reaction zone includes providing the first reaction zone with a metallurgy that has a lower rate of corrosion to acids compared to an original metallurgy. An embodiment of the invention is one, any or all of prior embodiments in this paragraph up through the first embodiment in this paragraph further comprising providing a line for combining a portion of the treated effluent with the renewable feedstock.

A second embodiment of the invention is a process for converting petroleum processing units into a renewable fuel processing plant, the process comprising providing a first reaction zone having an original configuration for treating a petroleum feedstock; reconfiguring the first reaction zone to provide a reconfigured first reaction zone for treating a renewable feedstock and providing a treated effluent; providing a guard bed zone for the reconfigured first reaction zone, the guard bed zone configured to remove metals, phosphorus, or both from the renewable feedstock; providing a second reaction zone having an original configuration for treating a petroleum feedstock; and, reconfiguring the second reaction zone to provide a reconfigured second reaction zone for converting the treated effluent and to provide a converted effluent, wherein the original configuration of at least one of the first reaction zone and the second reaction zone was as a hydrocracking zone, a reforming zone, or an isomerization zone. An embodiment of the invention is one, any or all of prior embodiments in this paragraph up through the second embodiment in this paragraph wherein the original configuration of the other of the first reaction zone and the second reaction zone was as a hydrotreating zone, a hydrocracking zone, a reforming zone, or an isomerization zone. An embodiment of the invention is one, any or all of prior embodiments in this paragraph up through the second embodiment in this paragraph wherein after reconfiguring the pressure of the first reaction zone is between about 3,447 and about 17,240 kPag and the pressure of the second reaction zone is between about 2,758 to about 4,826 kPag. An embodiment of the invention is one, any or all of prior embodiments in this paragraph up through the second embodiment in this paragraph wherein after reconfiguring the pressure of the first reaction zone is between about 3,447 and about 5,516 kPag and the pressure of the second reaction zone is between about 4,137 and about 17,240 kPag. An embodiment of the invention is one, any or all of prior embodiments in this paragraph up through the second embodiment in this paragraph wherein after reconfiguring the pressure of the first reaction zone is between about 3,447 and about 17,240 kPag and the pressure of the second reaction zone is between about 2,758 and about 17,240 kPag. An embodiment of the invention is one, any or all of prior embodiments in this paragraph up through the second embodiment in this paragraph further comprising providing a first separation zone for separating the treated effluent from the first reaction zone; and, providing a second separation zone for separating the converted effluent from the second reaction zone. An embodiment of the invention is one, any or all of prior embodiments in this paragraph up through the second embodiment in this paragraph wherein only one separation zone includes a compressor for a recycle gas stream. An embodiment of the invention is one, any or all of prior embodiments in this paragraph up through the second embodiment in this paragraph wherein the second separation zone provides a hydrogen containing gas stream that is passed to the first reaction zone. An embodiment of the invention is one, any or all of prior embodiments in this paragraph up through the second embodiment in this paragraph wherein both the first reaction zone and the second reaction zone receive a recycle gas stream that is combined with a make-up hydrogen gas stream.

A third embodiment of the invention is a process for converting a petroleum processing unit into a renewable fuel processing unit, the process comprising providing a first reaction zone having an original configuration for treating a petroleum feedstock, wherein the original configuration of the first reaction zone was as a hydrotreating zone, a hydrocracking zone, a reforming zone, or an isomerization zone; reconfiguring the first reaction zone to provide a reconfigured first reaction zone for treating a feedstock comprising substantially all renewable feedstock and providing a treated effluent; providing a guard bed zone for the reconfigured first reaction zone, the guard bed zone configured to remove metals, phosphorus, or both from the renewable feedstock; providing a stripping zone configured to remove one or more of hydrogen sulfide ($H_2S$), ammonia ($NH_3$), water ($H_2O$), carbon monoxide (CO) and carbon dioxide ($CO_2$) from a portion of the treated effluent and provide a liquid treated effluent and a gaseous stream including the carbon dioxide; providing a scrubbing zone configured to remove carbon dioxide from the gaseous stream and provide a scrubbed gaseous stream; and, providing a line to pass the liquid treated effluent to a fuel blending pool.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for converting petroleum processing units into a renewable fuel processing plant, the process comprising:
   reconfiguring a first reactor configured to treat a petroleum feedstock to a reactor for treating a renewable feedstock into hydrocarbons and providing a treated effluent;
   providing a stripping zone configured to remove one or more of hydrogen sulfide ($H_2S$), ammonia ($NH_3$), water ($H_2O$), carbon monoxide (CO) and carbon dioxide ($CO_2$) from the treated effluent and provide a gaseous stream;
   providing a hot separator vessel to separate the treated effluent into a hot separator gaseous stream and a hot separator liquid stream;
   passing at least portions of the hot separator gaseous stream and the hot separator liquid stream to a cold separator vessel to provide the gaseous stream and a hydrocarbon liquid phase;
   providing a scrubbing zone configured to remove carbon dioxide from the gaseous stream and provide a scrubbed gaseous stream;

reconfiguring a second reactor configured to treat a petroleum feedstock to a reactor for converting the treated effluent from first reactor and providing a converted effluent;

separating a hydrogen containing gas from the converted effluent; and, passing the hydrogen containing gas separated from the converted effluent to the first reactor;

wherein an original configuration of at least one of the first reactor and the second reactor was as a hydrotreating unit, a hydrocracking unit, a reforming unit, or an isomerization unit.

2. The process of claim 1 wherein a pressure of the first reactor is between about 3,447 and about 17,240 kPag and a pressure of the second reactor is between about 2,758 to about 4,826 kPag.

3. The process of claim 1 wherein a pressure of the first reactor is between about 3,447 and about 5,516 kPag and a pressure of the second reactor is between about 4,137 and about 17,240 kPag.

4. The process of claim 1 wherein a pressure of the first reactor is between about 3,447 and about 17,240 kPag and a pressure of reactor is between about 2,758 and about 17,240 kPag.

5. The process of claim 1 wherein the other of the first reactor and the second reactor was configured to treat the petroleum feedstock as a hydrocracking unit, a reforming unit, or an isomerization unit.

6. The process of claim 1 wherein both of the reactors were configured to treat the petroleum feedstock as a hydrocracking unit, a reforming unit, or an isomerization unit.

7. The process of claim 1 wherein the first reactor treated the petroleum feedstock differently than the second reactor.

8. The process of claim 1 further comprising:
providing a guard bed zone for the reconfigured first reactor to remove metals, phosphorus, or both from the renewable feedstock.

9. The process of claim 1 wherein converting the first reactor includes providing the first reactor with a metallurgy that has a lower rate of corrosion to acids compared to an original metallurgy.

10. The process of claim 1 further comprising:
providing a line for combining a portion of the treated effluent with the renewable feedstock.

11. A process for converting petroleum processing units into a renewable fuel processing plant, the process comprising:
providing a first reactor having an original configuration for treating a petroleum feedstock;
reconfiguring the first reactor to provide a reconfigured first reactor for treating a renewable feedstock and providing a treated effluent;
providing a guard bed zone for the reconfigured first reactor, the guard bed zone configured to remove metals, phosphorus, or both from the renewable feedstock;
providing a second reactor having an original configuration for treating a petroleum feedstock; and,
reconfiguring the second reactor to provide a reconfigured second reactor for converting the treated effluent and to provide a converted effluent,
wherein the original configuration of the first reactor was as a hydrocracking unit and the second reactor was as a reforming unit or an isomerization unit and after reconfiguring the first reactor is operated at a pressure of between about 3,447 and about 17,240 kPag and the second reactor is operated at a pressure between about 2,758 and about 17,240 kPag.

12. The process of claim 11 wherein after reconfiguring a pressure of the first reactor is between about 3,447 and about 17,240 kPag and a pressure of the second reactor is between about 2,758 to about 4,826 kPag.

13. The process of claim 11 wherein after reconfiguring a pressure of the first reactor is between about 3,447 and about 5,516 kPag and a pressure of the second reactor is between about 4,137 and about 17,240 kPag.

14. The process of claim 11 further comprising:
providing a first separation zone for separating the treated effluent from the first reactor; and,
providing a second separation zone for separating the converted effluent from the second reactor.

15. The process of claim 14 wherein only one separation zone includes a compressor for a recycle gas stream.

16. The process of claim 14 wherein the second separation zone provides a hydrogen containing gas stream that is passed to the first reactor.

17. The process of claim 14 wherein both the first reactor and the second reactor receive a recycle gas stream that is combined with a make-up hydrogen gas stream.

18. A process for converting a petroleum processing unit into a renewable fuel processing unit, the process comprising:
providing a first reactor having an original configuration for treating a petroleum feedstock, wherein the original configuration of the first reactor was as a hydrocracking unit, a reforming unit, or an isomerization unit;
reconfiguring the first reactor to provide a reconfigured first reactor for treating a feedstock comprising substantially all renewable feedstock and providing a treated effluent;
providing a guard bed zone for the reconfigured first reactor, the guard bed zone configured to remove metals, phosphorus, or both from the renewable feedstock;
providing a stripping zone configured to remove one or more of hydrogen sulfide ($H_2S$), ammonia ($NH_3$), water ($H_2O$), carbon monoxide (CO) and carbon dioxide ($CO_2$) from a portion of the treated effluent and provide a liquid treated effluent and a gaseous stream including the carbon dioxide;
providing a scrubbing zone configured to remove carbon dioxide from the gaseous stream and provide a scrubbed gaseous stream;
providing a second reactor having an original configuration for treating a petroleum feedstock, wherein the original configuration of the second reactor was as a hydrocracking unit, a reforming unit, or an isomerization unit;
reconfiguring the second reactor configured to provide a reconfigured second reactor for converting the liquid treated effluent from first reactor and providing a converted effluent;
separating a hydrogen containing gas from the converted effluent; and,
passing the hydrogen containing gas separated from the converted effluent to the first reactor,
wherein after the reconfiguring steps the first reactor is operated at a pressure between about 3,447 and about 17,240 kPag and the second reactor is operated at a pressure lower than the first reactor and between about 2,758 to about 4,826 kPag.

* * * * *